Oct. 7, 1952        A. T. McNEA        2,613,294
FLOAT OPERATED SWITCH
Filed June 15, 1951
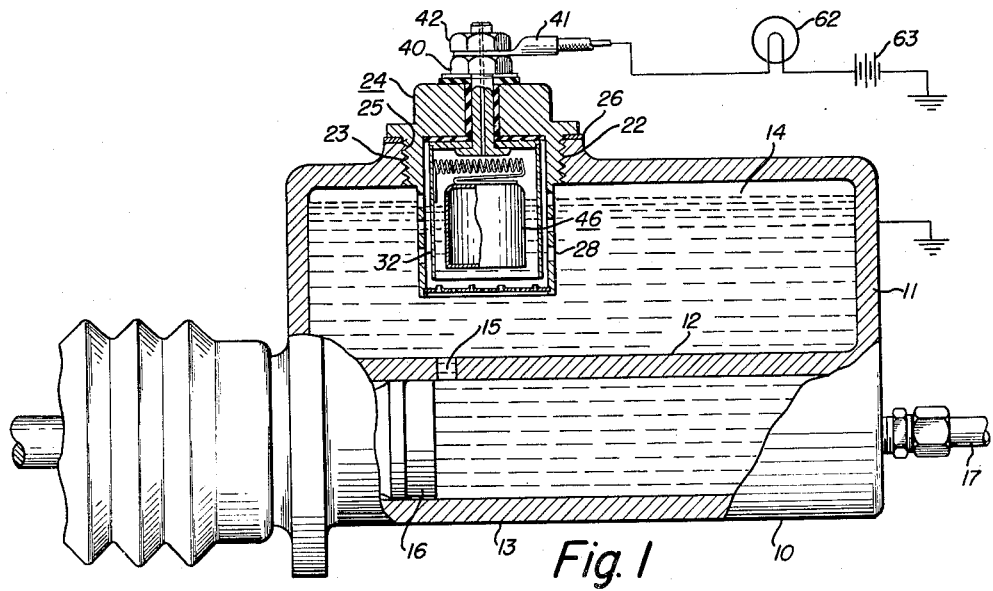
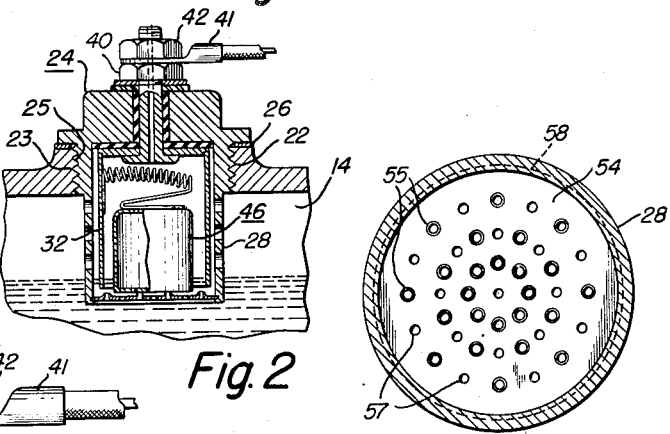
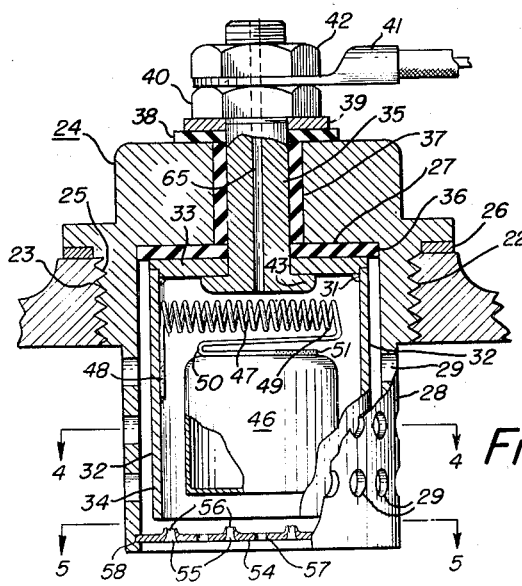
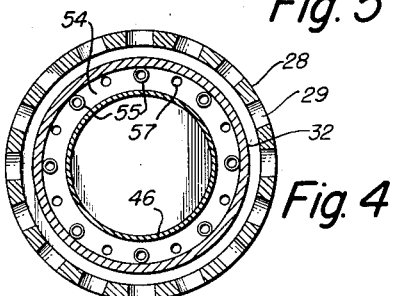
INVENTOR.
ALBERT T. McNEA
BY
Woodling and Krost
attys.

Patented Oct. 7, 1952

2,613,294

UNITED STATES PATENT OFFICE 2,613,294

FLOAT OPERATED SWITCH

Albert T. McNea, Cleveland, Ohio

Application June 15, 1951, Serial No. 231,833

8 Claims. (Cl. 200—84)

1

The invention, in general, relates to a float operated switch and more particularly to a float operated switch for a liquid level indicator for a hydraulic brake fluid reservoir.

In hydraulically operated brake systems for vehicles, a master cylinder is adapted to contain a supply of special brake fluid which is employed to operate the brakes. Loss of fluid from the master cylinder may occur from several causes, and thereby render the braking system inoperative without forewarning to the operator of the vehicle.

An object of the invention is the provision of a float operated switch for operating a warning device, such as a lamp or an alarm, to indicate to the operator of the vehicle that the liquid level in the master cylinder of the brake system has receded to a low predetermined level.

Another object of the invention is the provision of incorporating the float operated switch in a plug employed to close the filling opening of the fluid reservoir for the master cylinder.

Another object of the invention is the provision of rendering the float operated switch free from fluid surges.

Another object of the invention is the provision of mounting the float which constitutes a part of the float operated switch, in such a manner that the float will not stick and will not fail to give perfect operation.

Another object of the invention is the provision of mounting the float which constitutes a part of the switch inside of a shield to protect the float from fluid surges when the liquid level is above a predetermined height.

Another object of the invention is the provision of terminating the lower end of the shield which protects the float so that when the float recedes to a level at which it makes contact with electrical contact points, the float is exposed to fluid surges so that the surges may rock or laterally slide the bottom of the float against the contact points to aid in establishing one hundred per cent proof that the switch will operate.

Another object of the invention is the provision of a perforated metal disk having apertures with edges constituting the contact points against which the float engages when the liquid level recedes below a predetermined point.

Another object of the invention is the provision of suspending the float by a coil spring which acts as a cantilever in order to render the movements of the float free from mechanical restraint.

Another object of the invention is the provision

2 of a float constructed of metal which is shielded from the fluid surges by a shield also constructed of metal, in order that the metal float may not stick within the metal shield.

Other objects and a fuller understanding of the invention may be had by referring to the following description and claims, taken in conjunction with the accompanying drawing, in which:

Figure 1 is a side elevational view of a master cylinder having the float operated switch incorporated therein, a portion of the master cylinder and the float operated switch being shown in cross-section to better illustrate the parts;

Figure 2 is a fragmentary view of the float operated switch with the liquid level receding below a predetermined point;

Figure 3 is an enlarged view of the float operated switch and shows the float in its elevated position of the liquid;

Figure 4 is a cross-sectional view taken along the line 4—4 of Figure 3, and

Figure 5 is a cross-sectional view taken along the line 5—5 of Figure 3.

With reference to Figure 1 of the drawing, the float operated switch is shown in cooperation with a master cylinder 10 of a hydraulically operated brake system. The master cylinder 10 comprises a body 11 divided interiorly by a horizontal partition 12 into a working cylinder 13 and a fluid reservoir 14 from which fluid is free to flow into the cylinder 13 through a port 15 in the partition 12. A piston 16 operates in the cylinder 13 and is manually operated to apply pressure to the fluid so that the fluid may flow outwardly through the feed line 17 which is connected to the brakes.

The reservoir 14 is provided with a filling hole 22 having female threads 23 for receiving a metal plug 24 which is provided with male threads 25 for screwing into the female threads 23. As illustrated in the drawing, a gasket 26 may be employed to make a fluid-tight seal between the metal plug 24 and the reservoir 14.

The metal plug 24 has a top closure wall 27 and an annular perforated side wall 28 having openings 29 extending therethrough. The top closure wall 27 and the annular perforated side wall 28 constitute an inverted cup-shaped metal plug with the annular perforated side wall 28 extending downwardly into the fluid reservoir 14. Mounted within the inverted hollow cup-shaped metal plug is an inverted annular cup-shaped metal shield 32 which has a top wall 33 and an annular side wall 34. The top wall 33 and the annular side wall 34 may be constructed of individual parts and may be joined together by means of solder 31 or any other connecting means.

The metal shield 32 is supported or suspended within the inverted cup-shaped metal plug 24 by means of an electrical terminal stud 35 having a head 43 which engages the inside surface of the top wall 33 of the metal shield 32. The electrical terminal stud 35 is electrically connected to the top wall 33 of the shield 32 and mechanically secures the top wall 33 of the shield 32 to the top wall 27 of the metal plug 24 with the annular side wall 34 of the shield inwardly spaced from the annular perforated side wall of the plug 24.

As illustrated in the drawings, the electrical terminal stud 35 and the metal shield 32 are electrically insulated from the metal plug 24. Any suitable means may be employed to provide this electrical insulation, and as illustrated a washer 36 is mounted between the upper side of the top wall 33 of the metal shield 32 and the lower side of the top wall 27 of the metal plug 24. The electrical terminal stud 35 is insulated from the metal plug 24 by means of an insulated sleeve 37 and a flat insulated washer 38 is mounted on the outside of the metal plug 24 and underneath of a flat metal washer 39 to insulate the metal washer 39 from the metal plug 24. A fastening nut 40 holds the several parts together and when the nut 40 is turned down tight the head 43 for the electrical terminal stud 35 draws the top wall 33 of the metal shield 32 against the insulated washer 36 for mechanically suspending or supporting the metal shield 32 within the metal plug 24.

A terminal conductor 41 is connected to the electrical terminal stud 35 by means of a terminal nut 42, whereby an electrical circuit may be established with a warning lamp 62 energized from a battery 63 that is connected to ground, which ground is common to the ground for the reservoir 14 of the master cylinder 10.

Mounted within the metal shield 32 is a hollow metal float 46, which is floatably suspended therein by means of a coil spring 47 constructed as a cantilever. As illustrated, the coil spring 47 extends transversely of the shield 32 and has a first connection end 48 which may be soldered or otherwise connected to the side wall of the metal shield 32. The first connection end 48 constitutes an anchor for the cantilever. The free end of the cantilever of the spring 47 is indicated by the reference character 49. As illustrated, the second end of the spring 49 is continued in the form of a loop extension 50 having its end connected to the top of the float 46 at a second connection end 51. The operation of the cantilever coil spring is such that the float is given a great deal of free movement without mechanical restraint so that it may at all times be readily responsive to any change in the level of the liquid in the reservoir of the master cylinder. The construction of the cantilever coil spring is such that the float 46 may readily move up and down within the metal shield 32 without interference of engagement with the annular side wall 34. However, the float 46 is constructed principally of metal and the shield 32 is constructed principally of metal so that in the event that the float 46 should engage the inside wall of the shield, it makes a metal-to-metal contact which is free from any tendency to stick and give a false warning to the level of the oil within the master cylinder.

In the bottom of the perforated side wall 28 of the metal plug 24 there is mounted a perforated metal disk 54 having apertures 55 with edges 56 extending upwardly toward the bottom of the metal float 46. The edges 56 are contactable by said metal float for closing the circuit between the metal plug and the terminal stud in response to the hydraulic brake fluid in the reservoir receding below a predetermined level. The upwardly extending edges 56 are sharp and constitute electrical contact points for making excellent contact with the bottom of the float for closing the circuit to give the warning to the operator that the level has receded to a low predetermined point. The perforated metal disk 54 is also provided with plain apertures 57 so that any sludge which may tend to collect in the bottom of the metal plug may readily wash out through the plain apertures. Any suitable means may be employed to hold the perforated metal disk 54 in the bottom of the metal plug 24 and, as indicated, an annular groove 58 is employed into which the perforated metal disk may be resiliently snapped or otherwise inserted.

As illustrated, the side wall 34 of the metal shield 32 terminates at a spaced distance above the perforated metal disk 54 so that when the float recedes and contacts the electrical contact points the lower portion of the float is exposed to liquid surges so that the surges have the property of causing the float to scrape the electrical contact points and guarantee one hundred per cent electrical contact. When the liquid level is at a safe point, the bottom of the float is above the lower end of the metal shield so that the float under this condition of the liquid, is free from liquid surges. The assembly may be vented to atmosphere by providing a vent opening 65 which extends vertically through the electrical terminal stud 35.

In operation, when the liquid level is above a predetermined safe value, the float 46 is floatingly mounted in the metal shield 32 and the construction of the entire assembly is such that the float is free from up-and-down movements incident to jolting movements of the car body. However, when the liquid level recedes to a predetermined low value, the float naturally falls down gradually with the escapement of the fluid until it contacts the edges 56 of the perforated apertures 55, at which condition an electrical switch or circuit is established for providing a flow of current through the lamp 62 which is energized by the battery 63. Instead of a warning lamp 62, an alarm may be provided to indicate to the operator that the fluid level has receded to a low predetermined value and needs refilling in order to have safe operation of the brakes.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A float operated switch for a liquid level indicator for a hydraulic brake fluid reservoir, said reservoir having a filling hole provided with internal threads, said float operated switch comprising an inverted hollow cup-shaped metal plug having external threads for threadably engaging the internal threads of the filling hole, said metal plug having a top wall and an annular perforated side wall adapted to extend downwardly into said fluid reservoir, an inverted annular cup-shaped metal shield mounted within said hollow cup-shaped metal plug and having a top wall and an annular side wall, an electrical terminal stud electrically connected to the top wall of the shield and mechanically securing the top wall of the shield to the top wall of the plug with the annular side wall of the shield inwardly spaced from the annular perforated side wall of the plug, insulation means electrically insulating the terminal stud and the top wall of the shield from the top wall of the plug, a hollow metal float floatable on the hydraulic brake fluid within the annular shield, metal spring means for resiliently supporting the hollow float within the shield, said spring means having a first end mechanically and electrically connected to said shield and having a second end mechanically and electrically connected to the float, a perforated metal disk mounted in the bottom of the cup-shaped plug, said perforated metal disk having electrical contact points extending upwardly towards said metal float and being contactable by said metal float for closing a circuit between the metal plug and the terminal stud in response to the hydraulic brake fluid in the reservoir receding below a predetermined level.

2. A float operated switch for a liquid level indicator for a hydraulic brake fluid reservoir, said reservoir having a filling hole provided with internal threads, said float operated switch comprising an inverted hollow cup-shaped metal plug having external threads for threadably engaging the internal threads of the filling hole, said metal plug having a top wall and an annular perforated side wall adapted to extend downwardly into said fluid reservoir, an inverted annular cup-shaped metal shield mounted within said hollow cup-shaped metal plug and having a top wall and an annular side wall, an electrical terminal stud electrically connected to the top wall of the shield and mechanically securing the top wall of the shield to the top wall of the plug with the annular side wall of the shield inwardly spaced from the annular perforated side wall of the plug, insulation means electrically insulating the terminal stud and the top wall of the shield from the top wall of the plug, a hollow metal float floatable on the hydraulic brake fluid within the annular shield, metal spring means for resiliently supporting the hollow float within the shield, said spring means comprising a coil spring extending transversely of said shield as a cantilever, said coil spring having a first end mechanically and electrically connected to said shield and constituting an anchor for said cantilever and having a second end mechanically and electrically connected to the float and constituting a free end for said cantilever, a perforated metal disk mounted in the bottom of the cup-shaped plug, said perforated metal disk having electrical contact points extending upwardly towards said metal float and being contactable by said metal float for closing a circuit between the metal plug and the terminal stud in response to the hydraulic brake fluid in the reservoir receding below a predetermined level.

3. A float operated switch for a liquid level indicator for a fluid reservoir, said float operated switch comprising a metal plug for said reservoir, a metal shield having an annular side wall, terminal means electrically connected to the shield and mechanically suspending the shield from the plug with the annular side wall of the shield extending downwardly into said fluid reservoir, insulation means electrically insulating the terminal means and the shield from the plug, a metal float floatable on the fluid within the shield, metal spring means for resiliently supporting the float within the shield, electrical contact means electrically and mechanically connected to said plug and extending upwardly towards said metal float and being contactable by said metal float for closing a circuit between the metal plug and the terminal means in response to the fluid in the reservoir receding below a predetermined level.

4. A float operated switch for a liquid level indicator for a fluid reservoir, said float operated switch comprising a metal plug for said reservoir, a metal shield having an annular side wall, terminal means electrically connected to the shield and mechanically suspending the shield from the plug with the annular side wall of the shield extending downwardly into said fluid reservoir, insulation means electrically insulting the terminal means and the shield from the plug, a metal float floatable on the fluid within the shield, metal spring means for resiliently supporting the float within the shield, electrical contact means electrically and mechanically connected to said plug and extending upwardly towards said metal float and being contactable by said metal float for closing a circuit between the metal plug and the terminal means in response to the fluid in the reservoir receding below a predetermined level, said side wall of the shield terminating at a spaced distance above said contact means.

5. A float operated switch for a liquid level indicator for a fluid reservoir, said float operated switch comprising a metal plug for said reservoir, a metal shield having an annular side wall, terminal means electrically connected to the shield and mechanically suspending the shield from the plug with the annular side wall of the shield extending downwardly into said fluid reservoir, insulation means electrically insulating the terminal means and the shield from the plug, a metal float floatable on the fluid within the shield, metal spring means for resiliently supporting the float within the shield, electrical contact means electrically and mechanically connected to said plug and extending upwardly towards said metal float and being contactable by said metal float for closing a circuit between the metal plug and the terminal means in response to the fluid in the reservoir receding below a predetermined level, said metal spring means comprising a coil spring extending transversely of said shield as a cantilever, said coil spring having a first end mechanically and electrically connected to the side wall of said shield and constituting an anchor for said cantilever and having a second end mechanically and electrically connected to the float and constituting a free end for said cantilever.

6. A float operated switch for a liquid level indicator for a fluid reservoir, said float operated switch comprising a metal plug threadably connected to said reservoir, said metal plug having a closure wall for said reservoir, an inverted annular cup-shaped metal shield having a top wall and an annular side wall, terminal means electrically connected to the top wall of the shield and mechanically suspending the shield from the closure wall of the plug with the annular side wall of the shield extending downwardly into said fluid reservoir, insulation means electrically insulating the terminal means and the top wall of the shield from the closure wall of the plug; a metal float floatable on the fluid within the shield; metal spring means for resiliently supporting the float within the shield; electrical contact points electrically and mechanically connected to said plug and extending upwardly towards said metal float and being contactable by said metal float for closing a circuit between the metal plug and the terminal means in response to the fluid in the reservoir receding below a predetermined level.

7. A float operated switch for a liquid level indicator for a fluid reservoir, said float operated switch comprising a metal plug threadably connected to said reservoir, said metal plug having a closure wall for said reservoir, an inverted annular cup-shaped metal shield having a top wall and an annular side wall, terminal means electrically connected to the top wall of the shield and mechanically suspending the shield from the closure wall of the plug with the annular side wall of the shield extending downwardly into said fluid reservoir, insulation means electrically insulating the terminal means and the top wall of the shield from the closure wall of the plug, a metal float floatable on the fluid within the shield, metal spring means for resiliently supporting the float within the shield, said metal plug having an annular wall surrounding said shield, a perforated metal disk mounted in the bottom of said surrounding wall and having apertures with edges constituting electrical contact points extending upwardly towards said metal float and being contactable by said metal float for closing a circuit between the metal plug and the terminal means in response to the fluid in the reservoir receding below a predetermined level.

8. A float operated switch for a liquid level indicator for a fluid reservoir, said float operated switch comprising a metal plug threadably connected to said reservoir, said metal plug having a closure wall for said reservoir, an inverted annular cup-shaped metal shield having a top wall and an annular side wall, terminal means electrically connected to the top wall of the shield and mechanically suspending the shield from the closure wall of the plug with the annular side wall of the shield extending downwardly into said fluid reservoir, insulation means electrically insulating the terminal means and the top wall of the shield from the closure wall of the plug, a metal float floatable on the fluid within the shield, metal spring means for resiliently supporting the float within the shield, said metal plug having an annular wall surrounding said shield, a perforated metal disk mounted in the bottom of said surrounding wall and having apertures with edges constituting electrical contact points extending upwardly towards said metal float and being contactable by said metal float for closing a circuit between the metal plug and the terminal means in response to the fluid in the reservoir receding below a predetermined level, said side wall of the shield terminating at a spaced distance above said contact points.

ALBERT T. McNEA.

REFERENCES CITED

The following references are of record in the file of this patent:

UNITED STATES PATENTS

| Number | Name | Date |
|---|---|---|
| 2,253,260 | Alcorn | Aug. 19, 1941 |
| 2,479,503 | Moore | Aug. 16, 1949 |

FOREIGN PATENTS

| Number | Country | Date |
|---|---|---|
| 504,296 | Germany | June 21, 1927 |